United States Patent [19]
Mizuoka et al.

[11] Patent Number: 5,724,439
[45] Date of Patent: Mar. 3, 1998

[54] INSPECTING APPARATUS OF MOUNTED COMPONENT

[75] Inventors: Seiji Mizuoka, Moriguchi; Toshihiko Tsujikawa, Toyonaka; Kenji Okamoto, Hirakata; Kazuhiro Ikurumi, Katano; Youichiro Ueda, Takatsuki; Masanori Yasutake, Hirakata, all of Japan

[73] Assignee: Matsushita Electric Industrial Co., Ltd., Osaka-fu, Japan

[21] Appl. No.: 257,382

[22] Filed: Jun. 9, 1994

[30] Foreign Application Priority Data

Jun. 10, 1993 [JP] Japan ............... 5-138216

[51] Int. Cl.$^6$ ............................................. G06K 9/00
[52] U.S. Cl. .................... 382/149; 382/147; 382/165; 348/87; 348/126
[58] Field of Search ................ 382/145, 147, 382/149, 150, 162, 165; 348/87, 126, 129, 130; 356/237

[56] References Cited

U.S. PATENT DOCUMENTS

| | | | |
|---|---|---|---|
| 4,823,394 | 4/1989 | Berkin et al. | 382/145 |
| 5,012,524 | 4/1991 | Le Beau | 382/149 |
| 5,023,917 | 6/1991 | Bose et al. | 382/149 |
| 5,136,948 | 8/1992 | Fujino et al. | 348/87 |
| 5,164,994 | 11/1992 | Bushroe | 382/150 |
| 5,237,622 | 8/1993 | Howell | 348/87 |
| 5,245,671 | 9/1993 | Kobayashi et al. | 382/150 |

FOREIGN PATENT DOCUMENTS 5-113409  5/1993  Japan.

*Primary Examiner*—Leo Boudreau
*Assistant Examiner*—Chris Kelley
*Attorney, Agent, or Firm*—Wenderoth, Lind & Ponack

[57] ABSTRACT

A mounting state of a component mounted on a printed circuit board with adhesive is inspected by an apparatus which includes an image pick-up unit for picking up in colors an image of the board after the component is mounted, a color extracting part for discriminating an adhesive portion of the image based on a predetermined color distribution of the adhesive and then extracting the adhesive portion as extracted data, a cutting part for setting a window frame for a to-be-inspected portion in the image of the board relative to the extracted data so as to detect bulging of the adhesive, and cutting out data within the window frame, and a deciding part for deciding, based on the cut data, a presence/absence of the bulging of the adhesive from a size or an area of a portion in the window frame which shows a color within the color distribution of the adhesive.

2 Claims, 15 Drawing Sheets

INSPECTING APPARATUS OF MOUNTED COMPONENT

BACKGROUND OF THE INVENTION

The present invention relates to an inspecting apparatus of printed circuit boards used in electronic devices, and more particularly to an inspecting apparatus for inspecting, prior to a reflow process, the state of an electronic component mounted with the application of adhesive on a printed circuit board.

Figure 8:
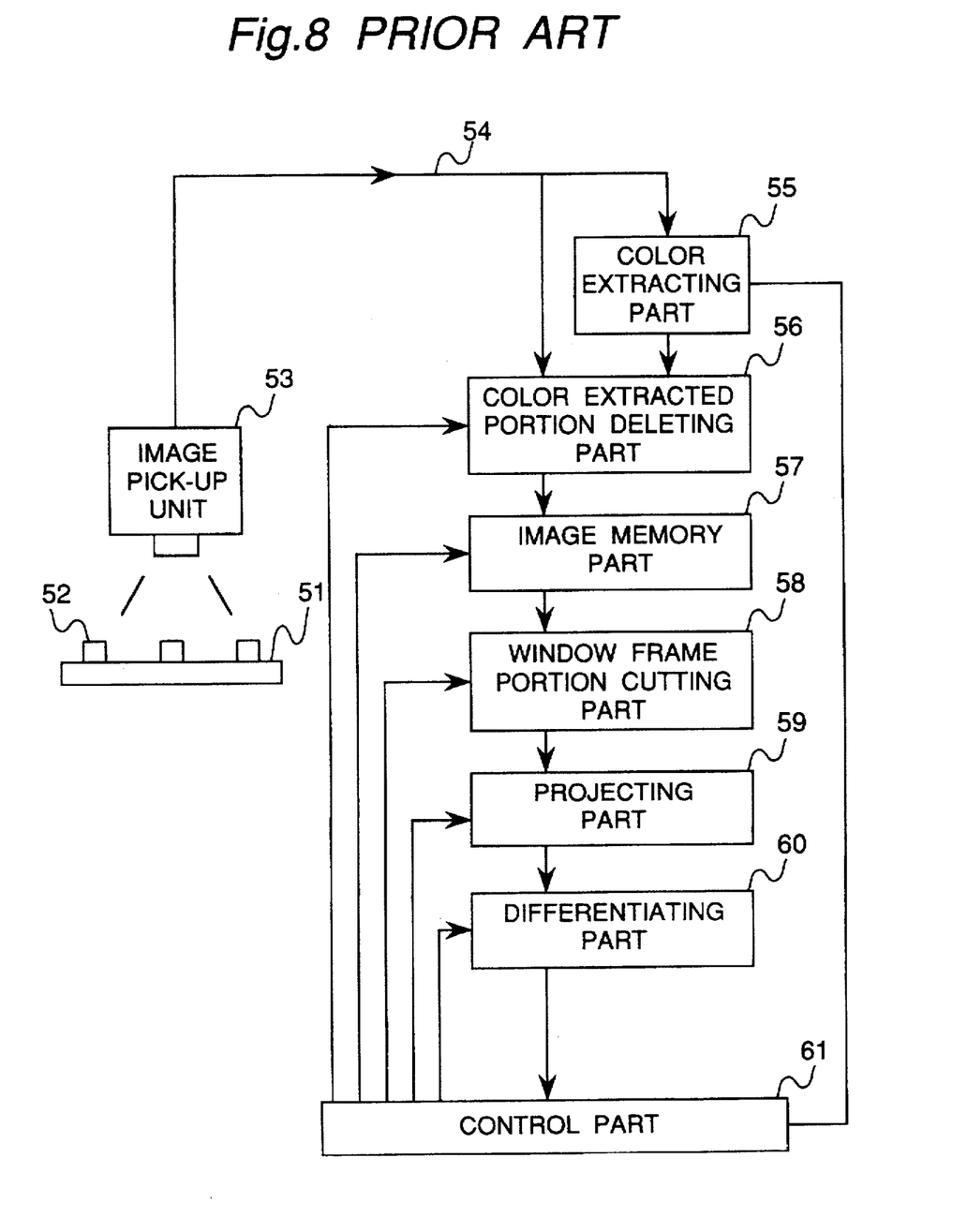
FIG. 8 is a structural block diagram of a conventional inspecting apparatus of a mounted component.
Figure 9:
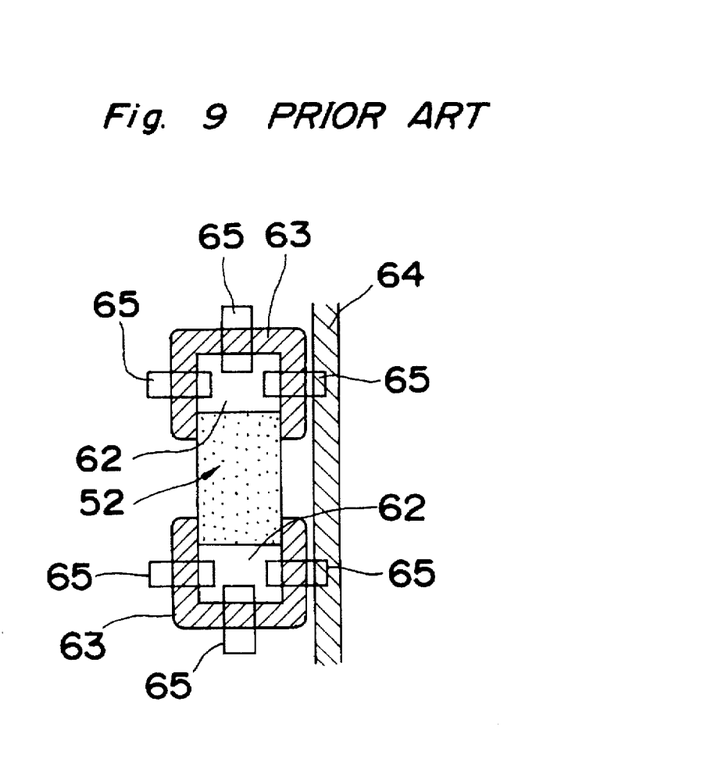
FIG. 9 is an explanatory diagram of the inspecting principle of the apparatus of FIG. 8.

A conventional inspecting apparatus of the type referred to above will be first depicted with reference to FIGS. 8 and 9.

In FIG. 8, reference numerals denote: 51 a printed circuit board; 52 an electronic component mounted on the printed circuit board; 53 an image pick-up unit; 54 a color video signal; 55 a color extracting part; 56 a deleting part of an extracted portion; 57 an image memory part; 58 a cutting part of a window frame portion; 59 a projecting part; 60 a differentiating part; and 61 a control part.

The apparatus in the above constitution operates in the following manner.

Referring to FIGS. 8 and 9, after the electronic component 52 is mounted to the printed circuit board 51, an image of the circuit board 51 is picked up in colors by the image pick-up unit 53. Portions showing respective colors within the color distribution of the printed circuit board 51, a silk 64, and a land 63 preliminarily supplied from the color extracting part 55 are decided to be the printed circuit board 51, silk 64, and land 63, and then extracted from the color video signal 54. The extracted portions from the color video signal 54 are deleted by the deleting part 56, and the remaining color video signal is stored by the image memory part 57. Thereafter, a window frame 65 is set to a to-be-detected portion of the remaining color video signal by the cutting part 58, as illustrated in FIG. 9. The color video signal in the window frame 65 is projected by the projecting part 59. The data of the projected image is differentiated by the differentiating part 60 to detect edges. Then, the position, inclination, and size of the electronic component 52 are detected from the position of the edges, whereby the mounting state of the electronic component 52 is inspected.

Since the above-described inspecting apparatus of the prior art has no function to inspect bulging of adhesive, even when an electrode portion of the electronic component is lifted over the land because of the bulge of the adhesive, that is, even when the soldering state after the reflow process is to result in failure, the electronic component is erroneously decided to be proper so long as the position thereof is correct.

SUMMARY OF THE INVENTION

The object of the present invention is therefore to provide an inspecting apparatus which can inspect beforehand that the soldering state of a mounted component after a reflow process will result in failure due to the bulge of adhesive.

In accomplishing these and other objects, according to one aspect of the present invention, there is provided an inspecting apparatus for inspecting a mounting state of a component mounted on a printed circuit board with adhesive which includes: an image pick-up unit for picking up in colors an image of the board after the component is mounted; a color extracting part for descriminating an adhesive portion of the image based on color distribution of the adhesive and then extracting the adhesive portion as extracted data; a cutting part for setting a window frame for a to-be-inspected portion in the image of the board to said extracted data so as to detect bulging of the adhesive, and cutting out data within said window frame; and a deciding part for deciding, based on the cut data, a presence/absence of the bulging of the adhesive from a size or an area of a portion in the window frame which shows a color within the color distribution of the adhesive.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

An inspecting apparatus of a mounted component according to a first embodiment of the present invention will be described in the first place with reference to FIGS. 1-3. In the first embodiment, a window frame for detecting bulge of adhesive is set, to extracted data, to include outlines of an electronic component with a body and electrodes and a circuit board with lands. In a second embodiment of the present invention, the window frame is set, to the extracted data, so as to detect bulging of adhesive out of the land of the board. In a third embodiment of the present invention, the window frame is set, to the extracted data, outside the electrode in correspondence with a detected position of the electrode so as to detect the bulging of the adhesive.

Figure 1:
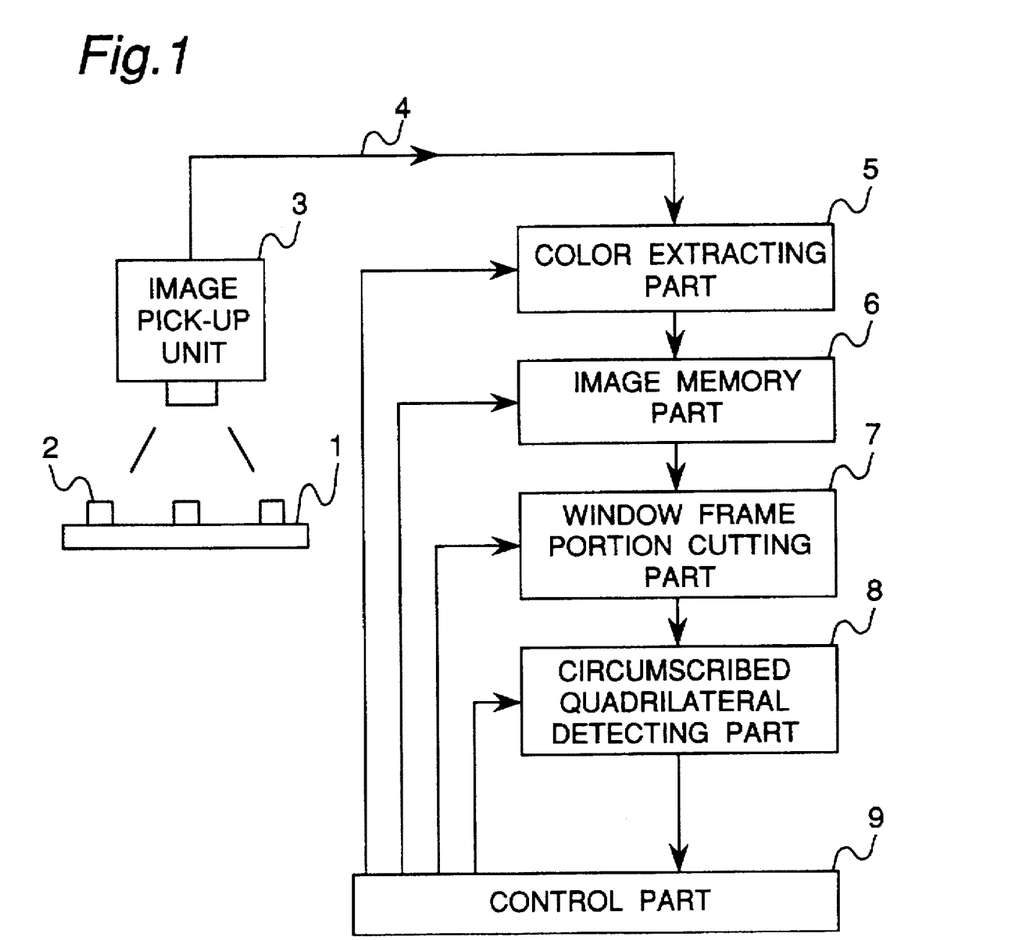
FIG. 1 is a block diagram showing the constitution of an inspecting apparatus of a mounted component according to a first embodiment of the present invention.

In FIG. 1, reference numerals denote respectively: 1 a printed circuit board; 2 an electronic component mounted on the circuit board 1; 3 an image pickup unit; 4 a color video signal; 5 a color extracting part; 6 an image memory part; 7 a cutting part of a window frame portion; 8 a detecting part of a circumscribed quadrilateral; and 9 a control part.

The relationship of the above elements will be discussed along with the operation thereof.

Figure 2:
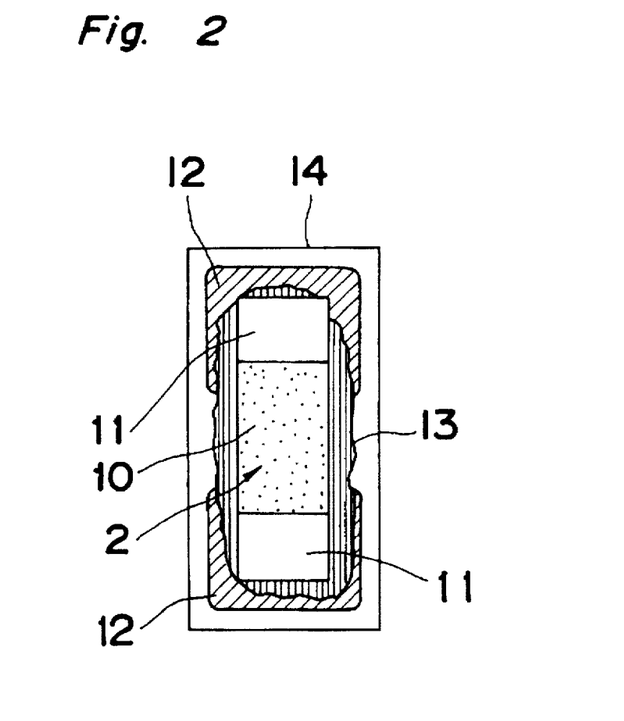
FIG. 2 is an explanatory diagram of the inspecting principle in the first embodiment of the present invention.

In FIGS. 1 and 2, an image of the printed circuit board 1 having the electronic component 2 mounted thereon is picked up in colors by the image pick-up unit 3, and the color video signal 4 is outputted to the color extracting part 5. The color extracting part 5, when receiving the color video signal 4, compares the color distribution of an adhesive 13 preliminarily fed from the control part 9 with the inputted color video signal 4 and discriminates a portion of the color video signal 4 existing within the color distribution of the adhesive 13 as the adhesive 13. The color extracting data indicating the adhesive portion is stored in the image memory part 6.

The cutting part 7 sets a window frame 14 for the stored data corresponding to the inspecting area including a body portion 10 and an electrode portion 11 of the electronic component 2 and a land portion 12 of the printed circuit board 1, as indicated in FIG. 2. The window frame 14 is sequentially generated from the cutting part 7.

Figure 3:
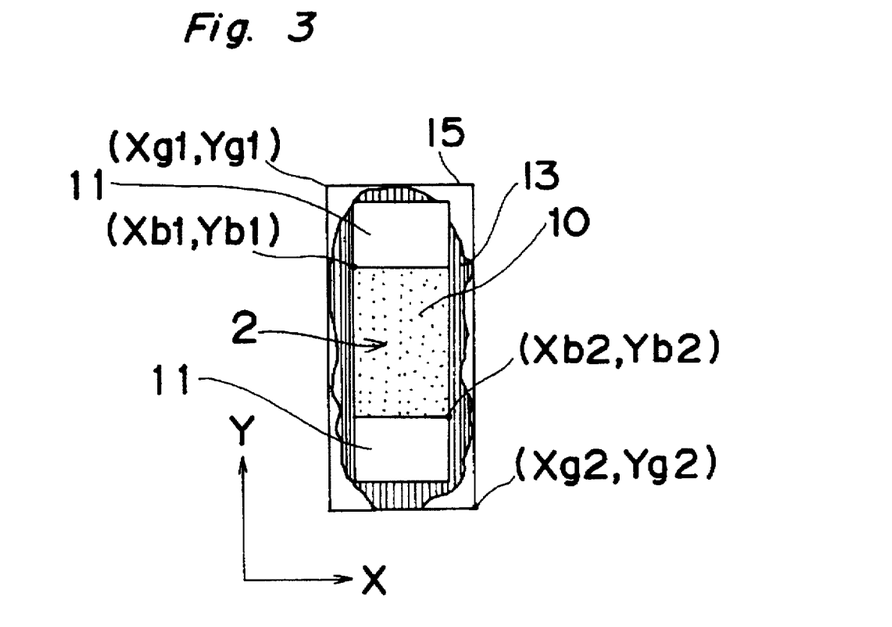
FIG. 3 is an explanatory diagram as to the manner of detecting a bulge of adhesive in the first embodiment.

The detecting part 8 obtains a circumscribed quadrilateral 15 of the adhesive 13 from the maximum and minimum values of an outline of the data within the window frame 14 generated from the cutting part 7 as shown in FIG. 3. The obtained data is sent from the detecting part 8 to the control part 9.

The control part 9 determines that the adhesive 13 bulges when the positional data of the upper left corner (Xg1, Yg1) and the lower right corner (Xg2, Yg2) of the circumscribed quadrilateral 15 of the adhesive 13 satisfies any one of the following expressions (1), (2), (3), and (4) relative to the upper left corner (Xb1, Yb1) and the lower right corner (Xb2, Yb2) of the body portion 10 of the electronic component 2:

$Xg1 < Xb1$ ... (1)

$Yg1 > Yb1$ ... (2)

$Xg2 > Xb2$ ... (3)

$Yg2 < Yb2$ ... (4)

The control part 9 determines that the adhesive 13 does not bulge when the positional data of the upper left corner (Xg1, Yg1) and the lower right corner (Xg2, Yg2) of the circumscribed quadrilateral 15 of the adhesive 13 does not satisfy the above expressions (1), (2), (3), and (4)

Figure 10:
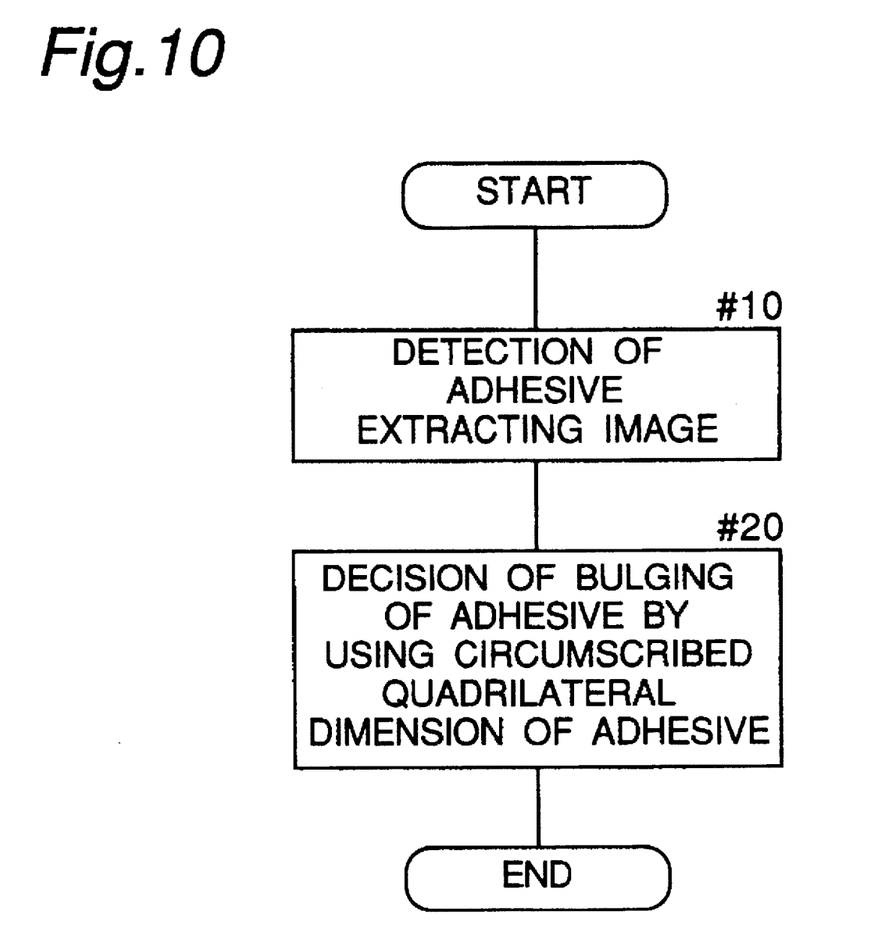
FIG. 10 is a flow chart showing detection of adhesive bulging by using the dimensions of a circumscribed quadrilateral of adhesive.

FIG. 10 Shows the detection of adhesive bulging by using dimension of circumscribed quadrilateral of adhesive according to the first embodiment. In FIG. 10, an adhesive extracting image is detected at step #10, and then the dimension of a circumscribed quadrilateral of adhesive is used to decide bulging of the adhesive at step #20. The detail process of steps #10 and #20 will be described below.

Figure 11:
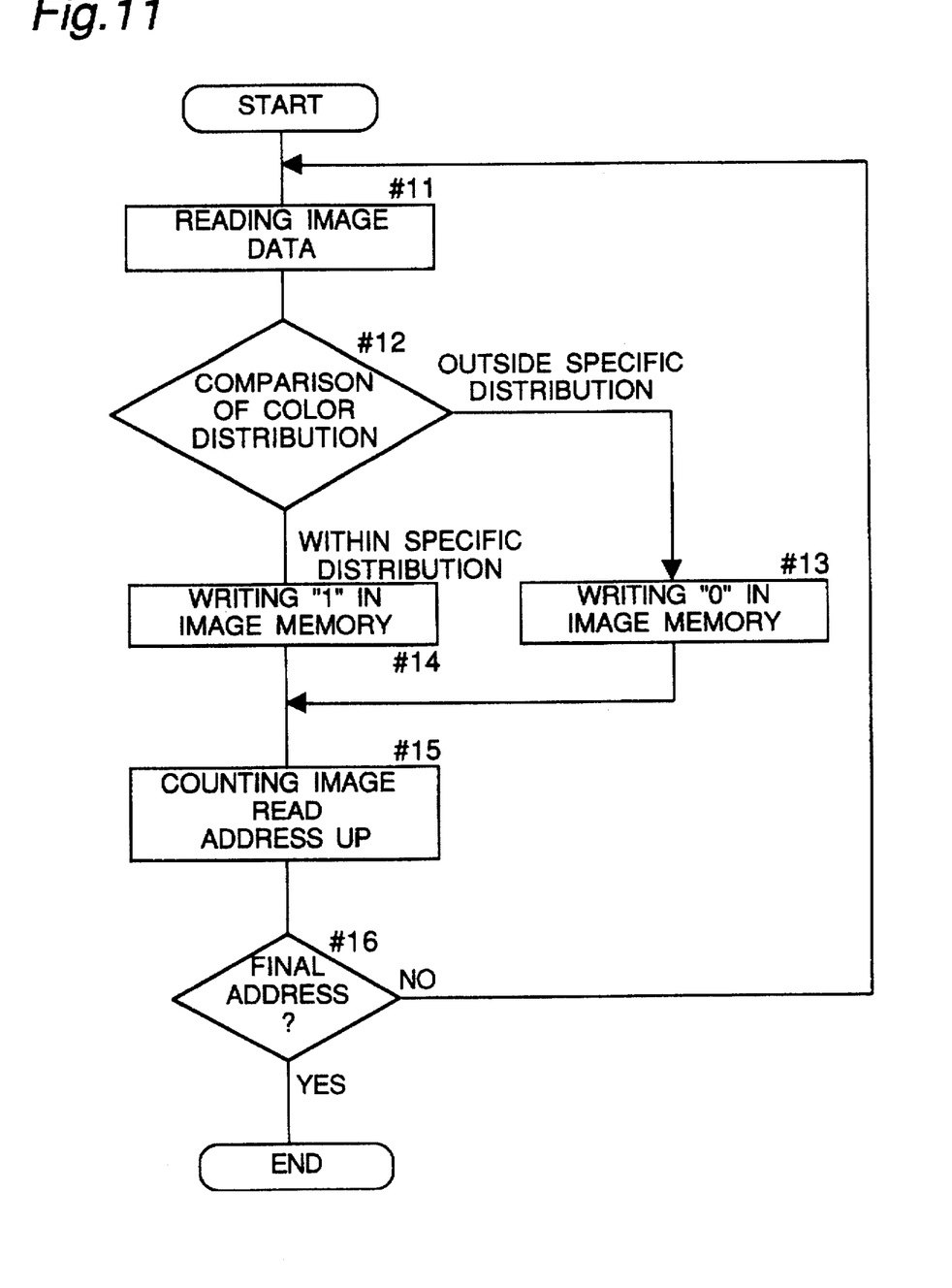
FIG. 11 is a flow chart showing detection of an extracted image of adhesive.

The process of the step #10 is shown in FIG. 11. In FIG. 11, first, image data is read at step #11. Then, color distribution of the image data is compared with a specific distribution at step #12. If the color distribution is outside the specific distribution at step #12, "0" is written in the image memory part 6 at step #13 to proceed to step #15. If the color distribution is within the specific distribution at step #12, "1" is written in the image memory part 6 at step #14 to proceed to step #15. At step #15, image read address is counted up. Then, at step #16, it is decided whether or not the address is a final address. If yes at step #16, this process is terminated. If no at step #16, the procedure of steps #11-16 is repeated.

Figure 12:
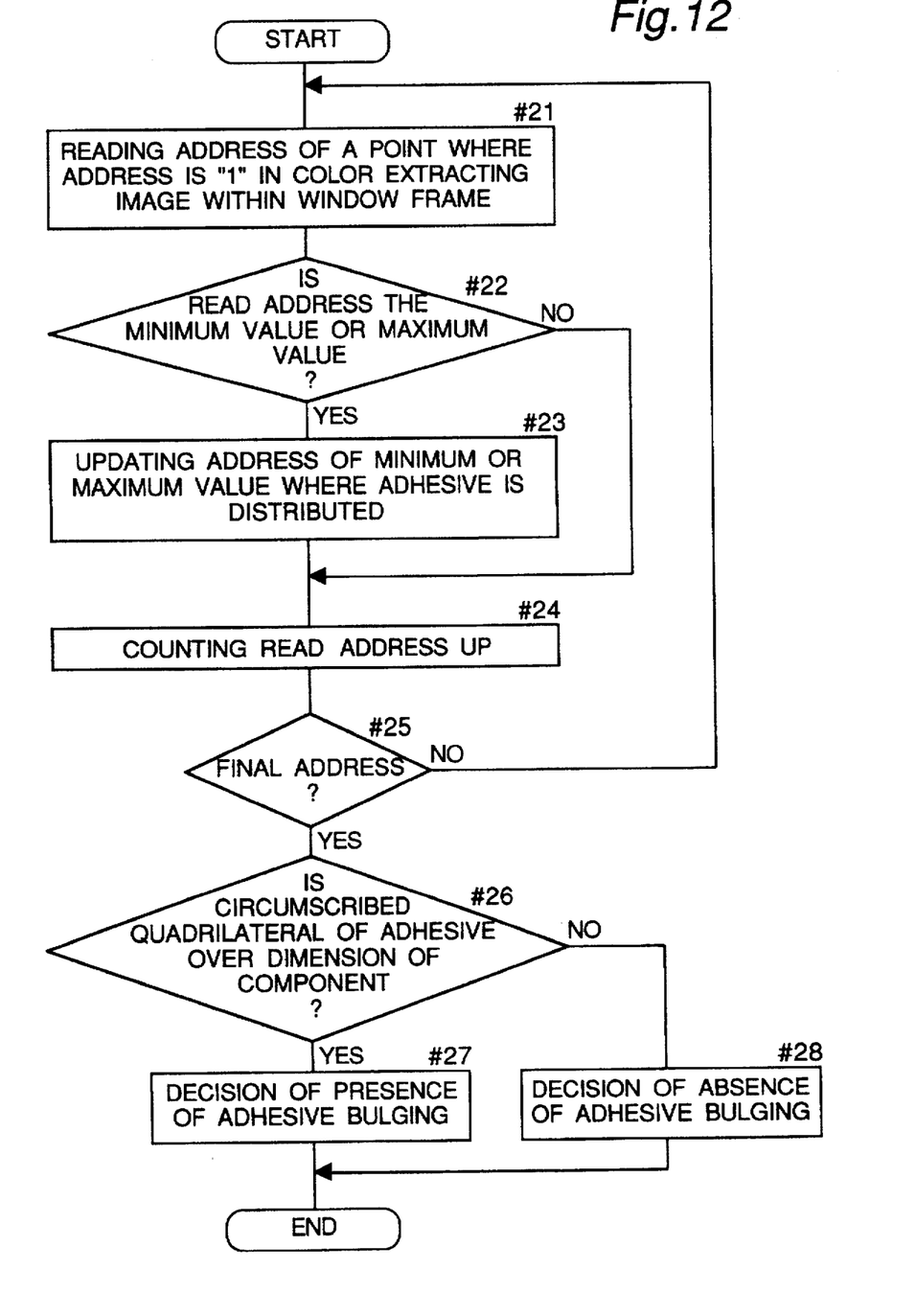
FIG. 12 is a flow chart showing the manner of detecting an adhesive bulging by using dimension.

The process of step #20 is shown in FIG. 12. In FIG. 12, an address of a point where an address is "1" in the color extracting image within the window frame is read at step #21. At step #22, it is decided whether or not the read address is the minimum value or the maximum value. If no, the flow proceeds to step #24. If yes, at step #23, the address of the minimum or maximum value where adhesive is distributed is updated. At step #24, a read address is counted up. At step #25, it is decided whether or not the read address is a final address. If so, the flow proceeds to step #26. If no, the flow returns to the step #21 and repeats steps #21-25. At step #26, it is decided whether or not the circumscribed quadrilateral of the adhesive is over the dimension of the component by using the expressions (1) through (4). If no at step #26, the flow proceeds to step #28 where it is decided that the bulging of the adhesive is absent and then the process is terminated. If yes at step #26, the flow proceeds to step #27 where it is decided that the bulging of the adhesive is present and then the process is terminated.

Hereinafter, an inspecting apparatus according to the second embodiment of the present invention will be depicted with reference to FIGS. 4 and 5.

Figure 4:
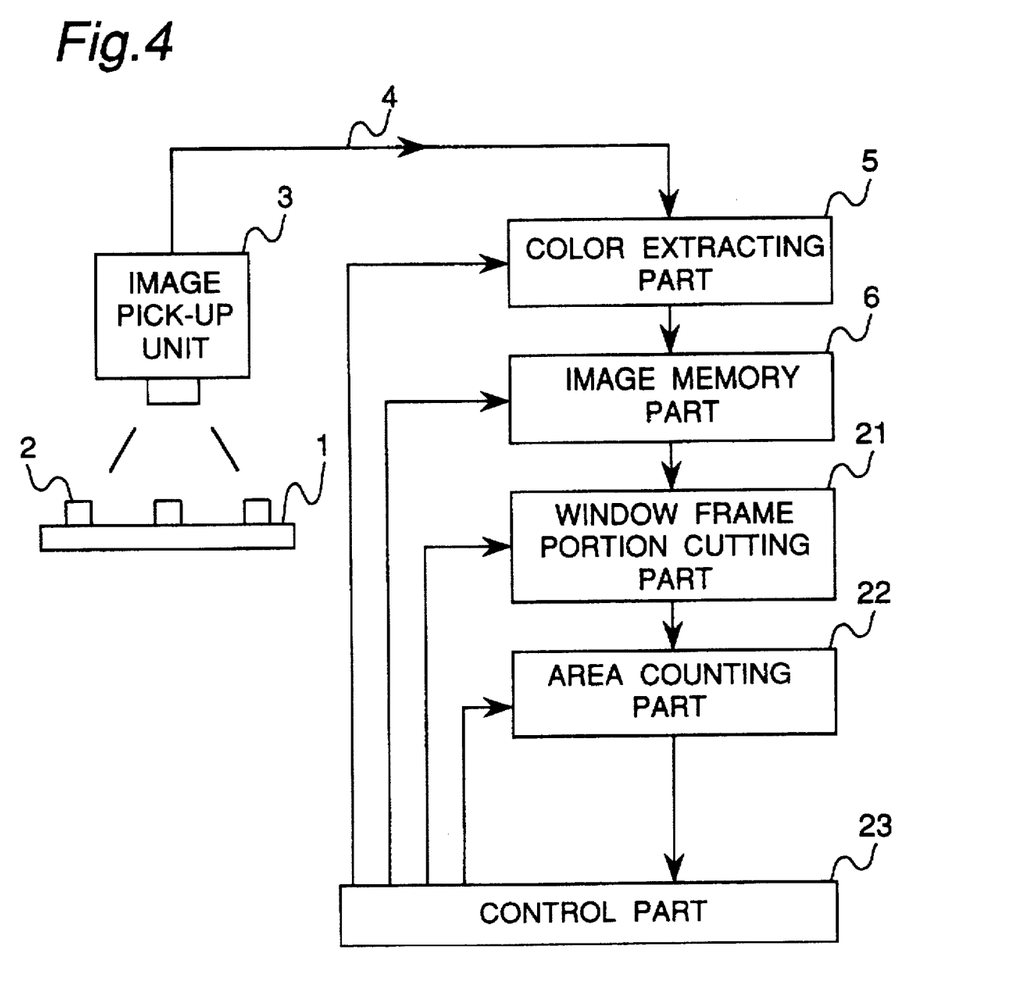
FIG. 4 is a structural block diagram of an inspecting apparatus of a mounted component according to a second embodiment of the present invention.

In FIG. 4, the printed circuit board 1, the electronic component 2, the image pick-up unit 3, the color video signal 4, the color extracting part 5, and the image memory part 6 are the same as those in the first embodiment, the description of which will be abbreviated here. Reference numerals 21, 22, and 23 represent a cutting part of a window frame portion, an area counting part, and a control part, respectively.

The relationship of the elements as well as the operation thereof will be described now.

Figure 5:
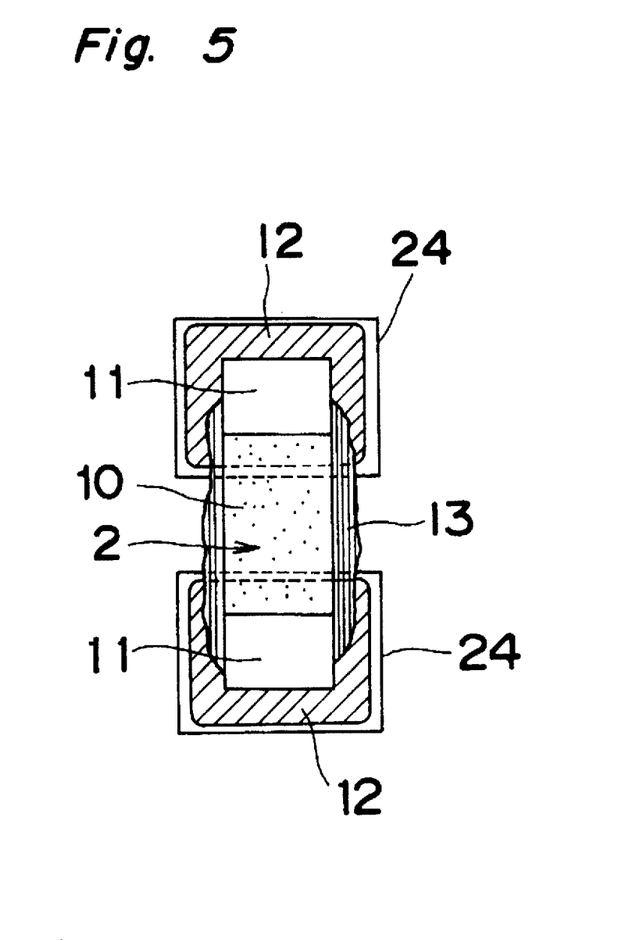
FIG. 5 is an explanatory diagram of the inspecting principle in the second embodiment of the present invention.

The cutting part 21 sets, as shown in FIG. 5, a window frame 24 to the land portion 12 on the printed circuit board 1 in the stored data, and sequentially outputs the same to the area counting part 22.

The area counting part 22 counts the area of the adhesive 13 present within the window frame 24 from the extracted data of the window frame 24 generated by the cutting part 21. The counted area value is outputted to the control part 23.

The control part 23 determines that the adhesive 13 bulges when the area value counted by the counting part 22 exceeds a preset value. The control part 23 determines that the adhesive 13 does not bulge when the area value counted by the counting part 22 does not exceed the preset value. The preset value is set for removing any noise so as to more accurately detect the bulge of the adhesive.

Figure 13:
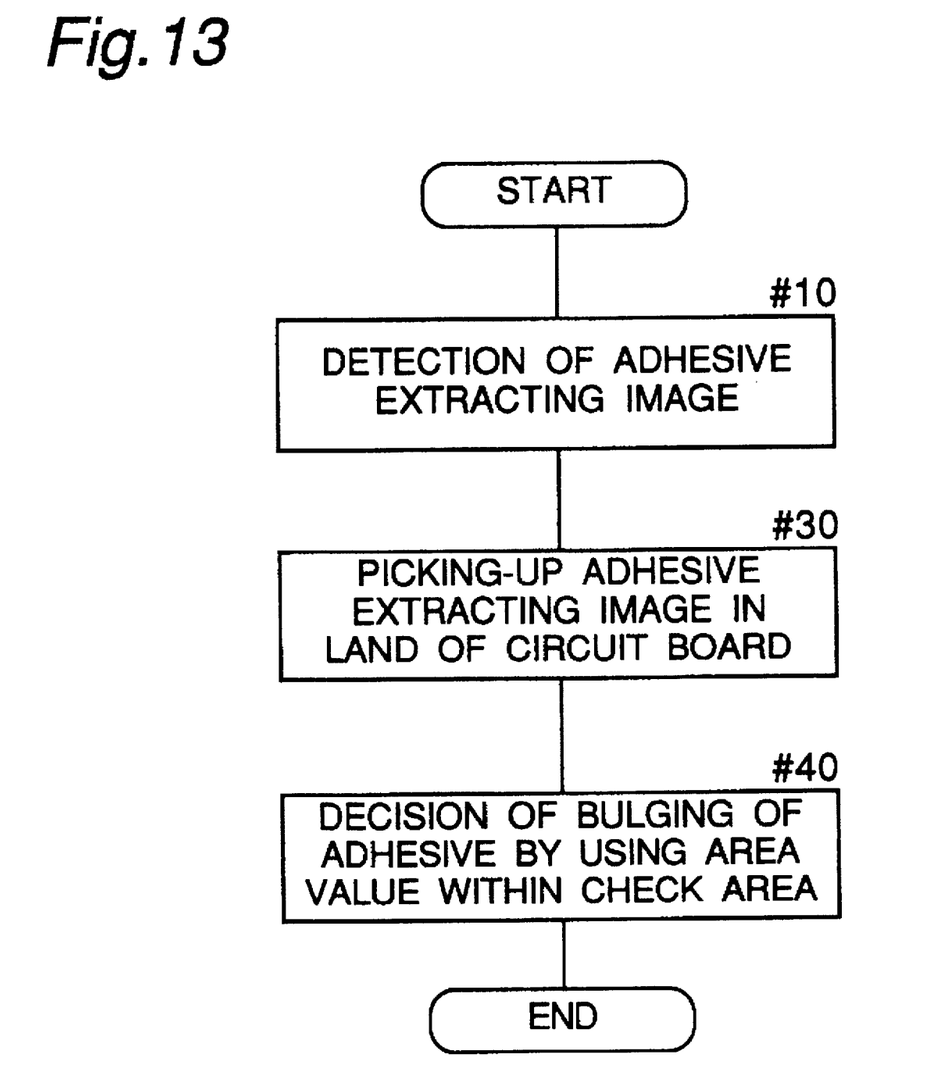
FIG. 13 is a flow chart showing detection of bulging wherein a detection check area is set on a land portion of adhesive.

FIG. 13 is a flow chart showing detection of bulging wherein a detection check area is set on the land portion of the printed circuit board according to the second embodiment. In FIG. 13, an adhesive extracting image is detected at step #10 described above, and then an adhesive extracting image within the land portion of the circuit board is taken out at step #30, and then an area value within a check area is used to decide bulging of the adhesive at step #40. The detail process of step #40 will be described below.

Figure 14:
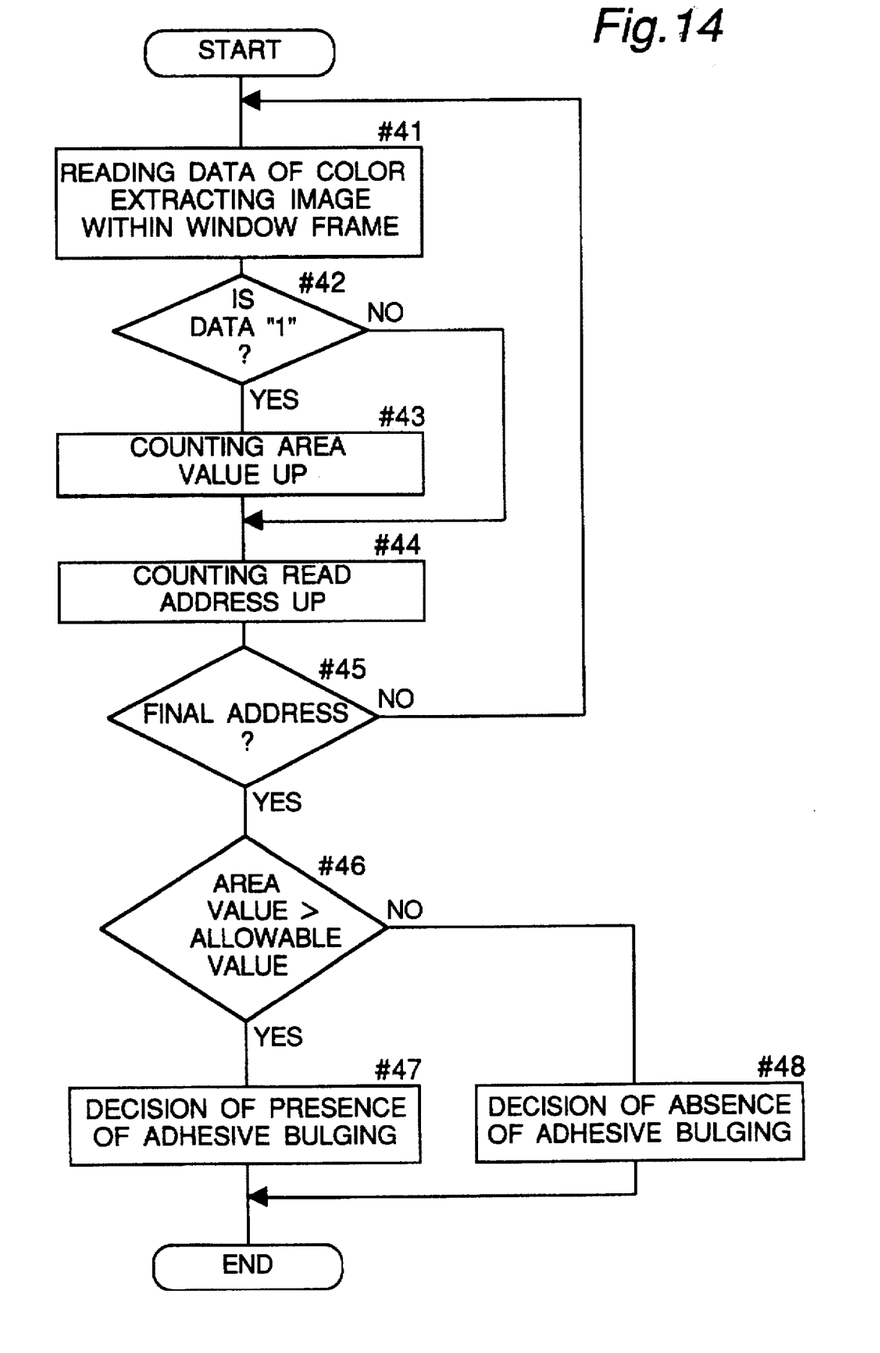
FIG. 14 is a flow chart showing detection of adhesive bulging by using an area value.

The process of the step #40 is shown in FIG. 14. In FIG. 14, first, color extracting image data within the window frame is read at step #41. Then, at step #42, it is decided whether or not the read data is "1" If no at step #42, the flow proceeds to step #44. If yes at step #42, an area value is counted up at step #43. At step #44, the read address is counted up. At step #45, it is decided whether or not the read address is a final address. If no, the flow returns to step #41 to repeat steps #41–45. If yes, it is decided whether or not the area value is greater than the allowable value (the above preset value) at step #46. If no at step #46, the flow proceeds to step #48 wherein it is decided that the bulging of the adhesive is absent and then the process is terminated. If yes at step #46, the flow proceeds to step #47 wherein it is decided that the bulging of the adhesive is present and then the process is terminated.

The third embodiment of the present invention will now be discussed with reference to FIGS. 6 and 7.

Figure 6:
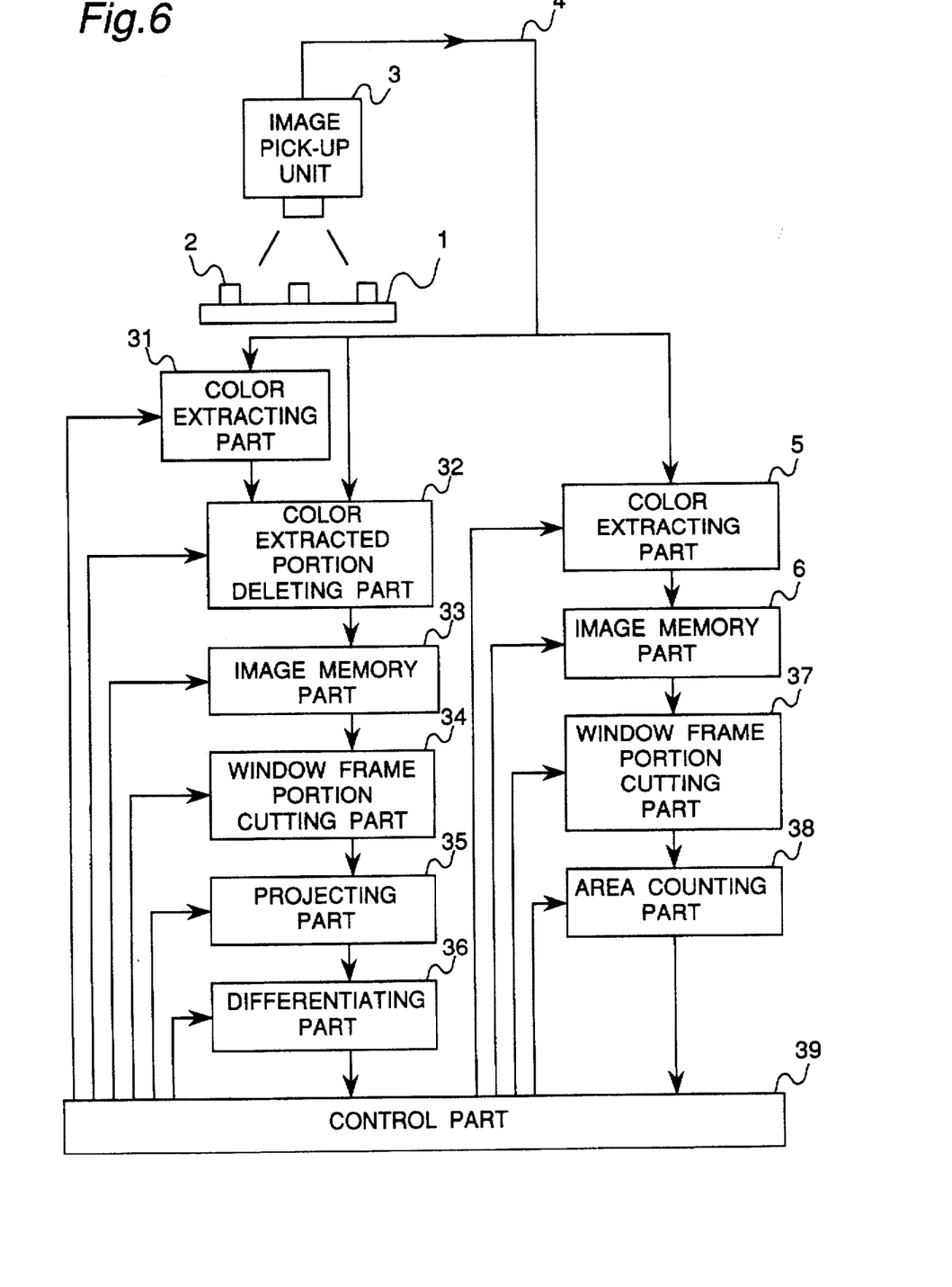
FIG. 6 is a structural block diagram of an inspecting apparatus of a mounted component according to a third embodiment of the present invention.

In FIG. 6, since the printed circuit board 1, the electronic component 2, the image pick-up unit 3, the color video signal 4, the color extracting part 5, and the image memory part 6 are the same as in the first embodiment, the description of these elements will be applied here. Meanwhile, reference numerals 31–39 denote a color extracting part, a deleting part of an extracted portion, an image memory part, a cutting part of a window frame portion, a projecting part, a differentiating part, a cutting part of a window frame portion, an area counting part, and a control part, respectively.

The relationship of the above elements will be described together with the operation thereof.

Figure 7:
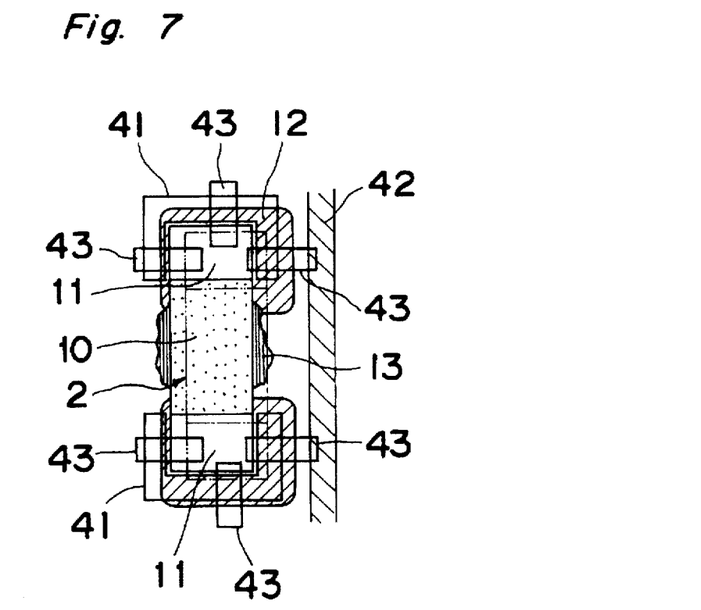
FIG. 7 is an explanatory diagram of the inspecting principle in the third embodiment of the present invention.

In FIGS. 6 and 7, the color extracting part 31 compares the color distribution of the printed circuit board 1, a silk 42 (provided for prevention of bridges and for display of component numbers and composed of a printed film of insulating material), and a land 12 fed from the control part 39 beforehand with the receiving color video signal 4. Then, the color extracting part 31 decides that portions showing the color distribution of the printed circuit board 1, silk 42, and land 12 is the printed circuit board 1, silk 42, and land 12, with generating the data of the portions to the deleting part 32.

The deleting part 32, upon receipt of the color video signal 4 and the data from the extracting part 31, deletes the portions of the data from the color video signal 4 and outputs the remaining color video signal. That is, the color video signal having only the electronic component 2 left on the printed circuit board 1 is generated. The image memory part 33 stores the remaining color video signal.

As shown in FIG. 7, the cutting part 34 sets a window frame 43 to a part of the stored color video signal including the electrode portion 11 of the electronic component 2. The data of the window frame 43 is sequentially outputted to the projecting part 35.

The projecting part 35 projects as a projected image the color video data in the window frame 43 obtained from the cutting part 34. The differentiating part 36 differentiates the data of the projected image thereby to detect edges. When the control part 39 receives the edges from the differentiating part 36, it detects the position of the electrode portion 11 of the electronic component 2 based on the positions of the edges.

The cutting part 37, receiving the position of the electrode portion 11 of the electronic component 2 from the control part 39, sets a window frame 41 for detecting the adhesive 13 in the outer periphery of the electrode portion 11 among the data stored in the image memory part 6. At this time, as clearly shown in FIG. 7, the window frame 41 is set corresponding to the position of the detected electrode portion 11. The window frame 41 is sequentially outputted to the area counting part 38.

The area counting part 38 counts the area of the adhesive 13 in the window frame 41 from the data of the window frame 41 obtained by the cutting part 37, and sends the counted area value to the control part 39.

The control part 39 determines the presence of bulge of the adhesive 13 when the area value output from the area counting part 38 is over a preset value. The control part 39 determines the nonpresence of bulge of the adhesive 13 when the area value output from the area counting part 38 is not over a preset value. The preset value is set for removing any noise so as to more accurately detect the bulge of the adhesive.

Figure 15:
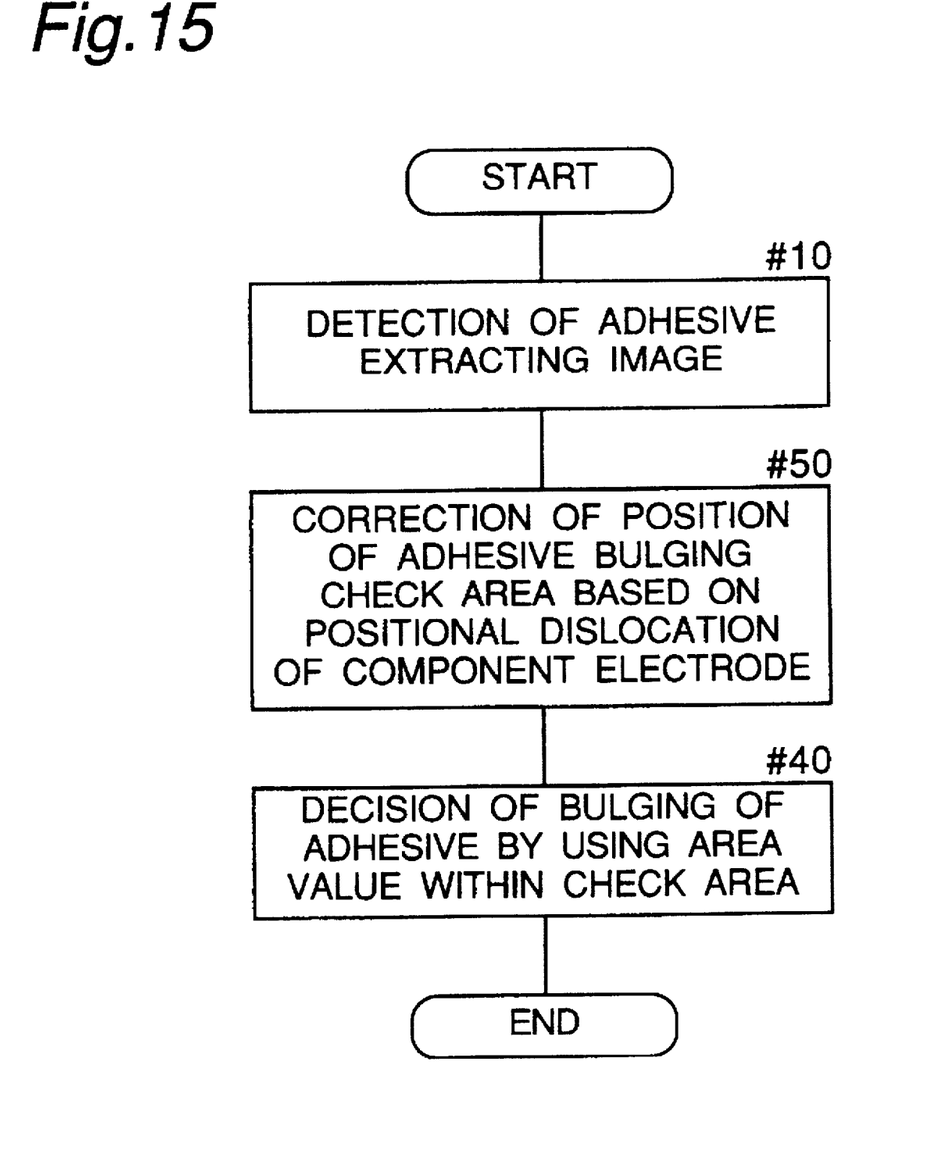
FIG. 15 is a flow chart showing detection of adhesive bulging wherein a detection check area is set on an electrode portion of an electronic component.

FIG. 15 is a flow chart showing detection of bulging wherein a detection check area is set on the electrode portion of the electronic component according to the third embodiment. In FIG. 15, an adhesive extracting image is detected at step #10 described above, and then the position of a check area for detecting adhesive bulging is corrected based on a positional dislocation of the electrode portion of the component at step #50, and then an area value within a check area is used to decide bulging of the adhesive at step #40 described above. The detail process of step #50 will be described below.

Figure 16:
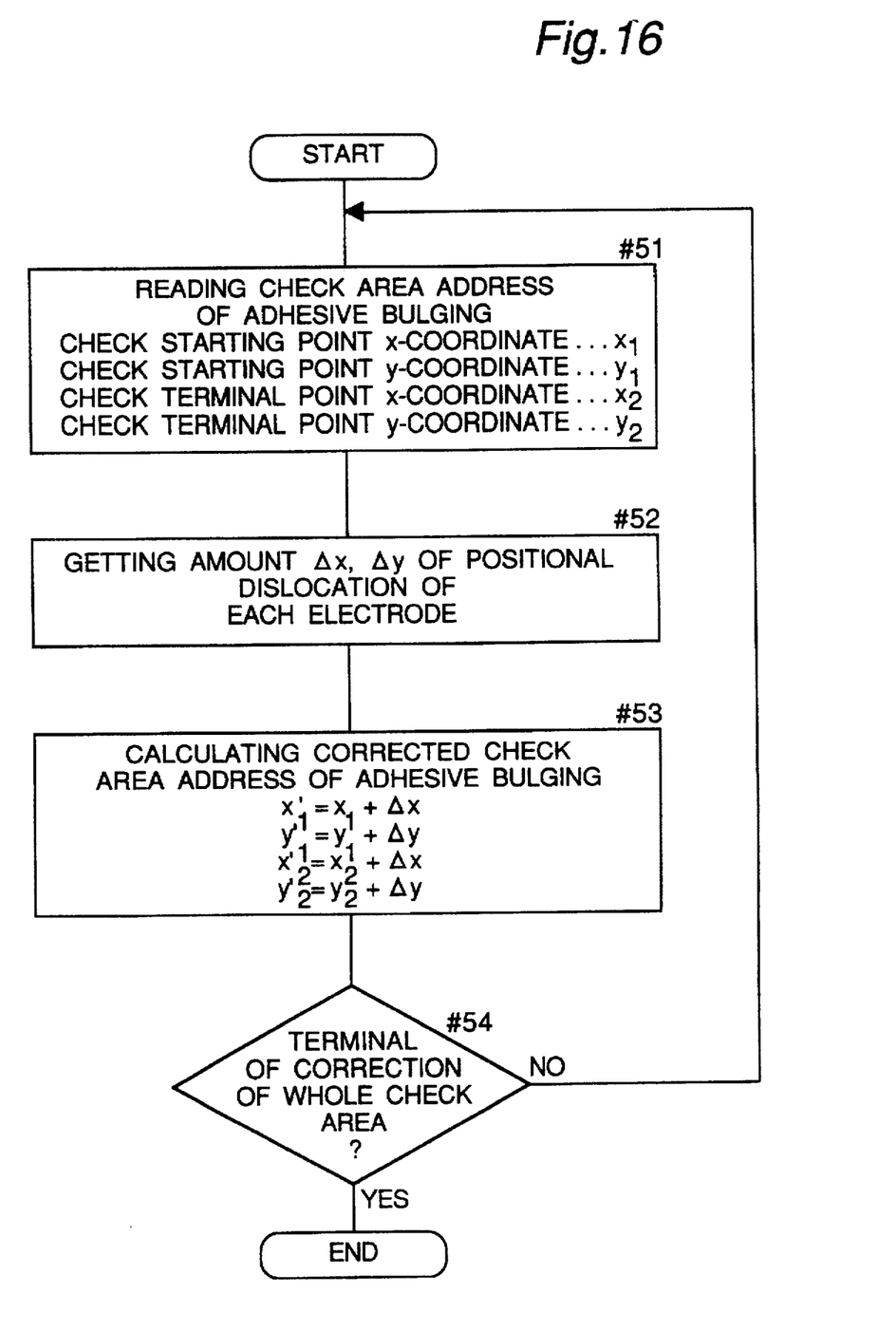
FIG. 16 is a flow chart showing detection of correction of a position of a check area for detecting adhesive bulging based on dislocation of an electrode portion.

The process of the step #50 is shown in FIG. 16. In FIG. 16, first, the address of the check area for detecting the bulging of the adhesive is read at step #51. The x-coordinate of a check start point is set as $x_1$. The y-coordinate of a check start point is set as $y_1$. The x-coordinate of a check terminal point is set as $x_2$. The y-coordinate of a check terminal point is set as $y_2$. Then, at step #52, the amounts $\Delta x$, $\Delta y$ of the positional dislocations of each electrode portion in the x- and y-coordinates are got at step #52. Then, at step #53, the corrected address of the check area for detecting bulging of the adhesive is calculated as follows:

$$x'_1 = x_1 + \Delta x$$

$$y'_1 = y_1 + \Delta y$$

$$x'_2 = x_2 + \Delta x$$

$$y'_2 = y_2 + \Delta y$$

Figure 17:
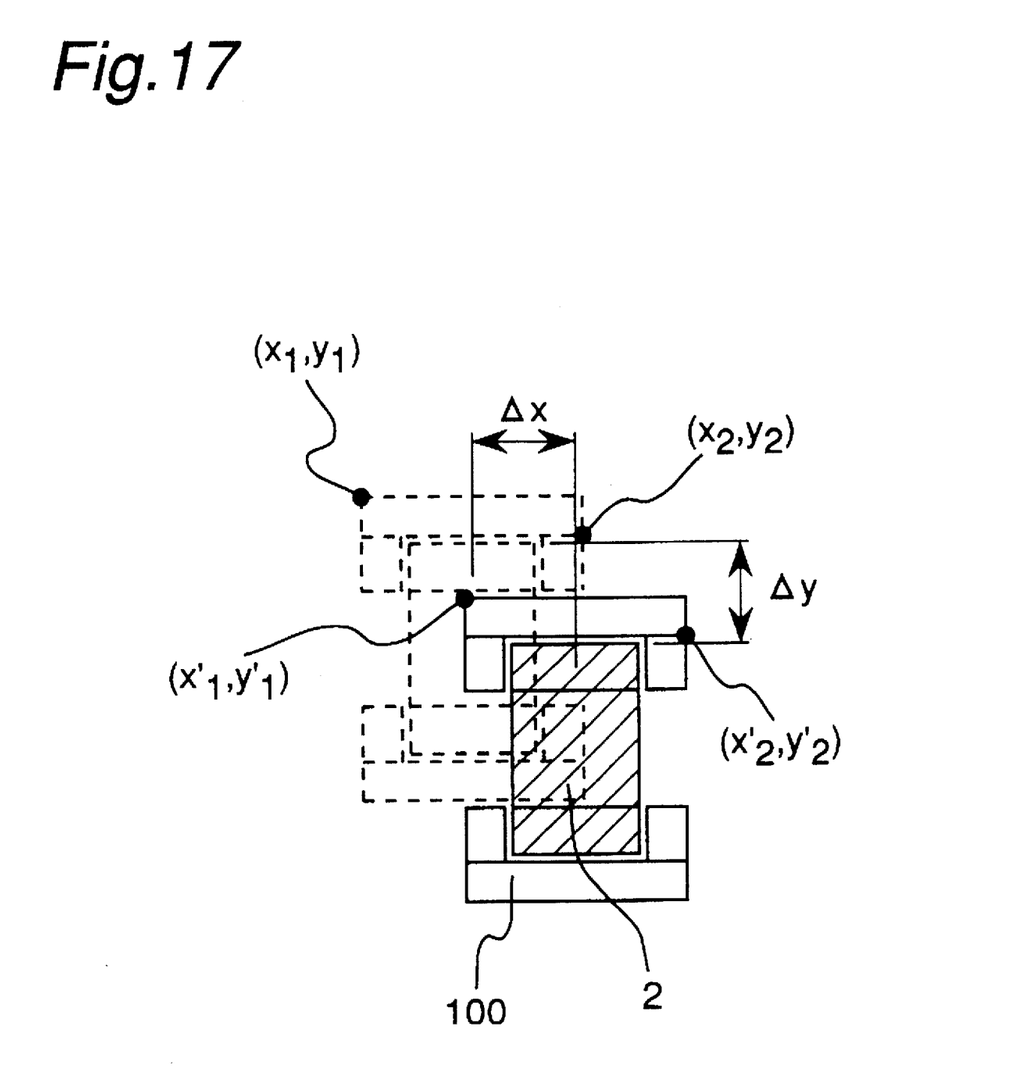
FIG. 17 is an explanatory diagram showing the correction in FIG. 16.

Then, at step #54, it is decided whether or not the correction of the whole check area is terminated. If no at step #54, the flow returns to step #51 to repeat steps #51–54. If yes at step #54, the process is terminated. FIG. 17 shows the correction in FIG. 16. The coordinates $(x_1, y_1)$ and $(x_2, y_2)$ are the coordinates of the check area 100 before the correction, and the coordinates $(x'_1, y'_1)$ and $(x'_2, y'_2)$ are the coordinates of the check area 100 after the correction.

In the inspecting apparatus of the first embodiment of the present invention, as described hereinabove, a part of the color video signal present within the color distribution of the adhesive is decided to be the adhesive. By extracting the data indicating the part of the adhesive and obtaining the size and area of the part, the presence/absence of bulging of the adhesive is decided. Accordingly, the soldering state which is to result in failure after a reflow process can be inspected beforehand.

According to the second embodiment of the present invention, since the window frame for a to-be-inspected part is set to the land portion of the printed circuit board, bulging of the adhesive is correctly inspected without being adversely influenced by bulge of the adhesive outside the land portion which does not cause the defective soldering.

According to the third embodiment, in a case where even if the adhesive bulges on the land at a portion, the portion is not overlapped with the electrode portion of the electronic component and thus such bulging of the adhesive at this portion does not cause the defective soldering, bulging of the adhesive at the other portion can be correctly inspected without being adversely influenced by such bulging because the window frame is set outside the electrode in correspondence with the detected position of the electrode.

In the embodiments, the color extracting part 5 can be arranged after the image memory part 6 for storing both of the data from the image pick-up unit 3 and the extracted data.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An inspecting apparatus for inspecting a mounting state of a component mounted on a printed circuit board with adhesive, comprising:

an image pick-up unit for picking up in colors an image of the board after the component is mounted;

a color extracting part for discriminating a portion of the image depicting the adhesive based on a predetermined color distribution of the adhesive and then extracting the thus discriminated adhesive portion of the image as extracted data;

an image cutting part for setting a window frame defining a to-be-inspected portion in the image of the board, and extracting a portion of the image within said window frame as window frame data; and a deciding part for deciding, based on the extracted data and the window frame data, whether the mounting state of the component includes an unacceptable bulging of the adhesive according to a size or an area of the adhesive portion of the image within the window frame of the image which exhibits a color within the predetermined color distribution of the adhesive;

wherein the component includes at least one electrode, and wherein the window frame is set around a detected position of the at least one electrode;

wherein the deciding part discriminates the presence of unacceptable bulging of the adhesive when the size or area of the adhesive portion of the image within the window frame exceeds a preset value and discriminates the absence of unacceptable bulging of the adhesive when the size or area of the adhesive portion in the window frame does not exceed the preset value.

2. An inspecting apparatus for inspecting a mounting state of a component mounted on a printed circuit board with adhesive, comprising:

an image pick-up unit for picking up in colors an image of the board after the component is mounted;

a color extracting part for discriminating any portion of the image depicting the adhesive based on a predetermined color distribution of the adhesive and then extracting the thus discriminated adhesive portion of the image as extracted data;

an image cutting part for setting a window frame defining a to-be-inspected portion in the image of the board, and extracting a portion of the image within said window frame as window frame data;

a deciding part for deciding, based on the extracted data and the window frame data, whether the mounting state of the component includes an unacceptable bulging of the adhesive according to a size or an area of the adhesive portion of the image within the window frame of the image which exhibits a color within the predetermined color distribution of the adhesive;

wherein the window frame is set around a land of the printed circuit board; and wherein the deciding part discriminates the presence of unacceptable bulging of the adhesive when the size or area of the adhesive portion of the image within the window frame exceeds a preset value and discriminates the absence of unacceptable bulging of the adhesive when the size or area of the adhesive portion in the window frame does not exceed the preset value.

* * * * *